Patented Jan. 7, 1936

2,026,619

UNITED STATES PATENT OFFICE

2,026,619

PROCESS FOR PRODUCING N-p-AMINO-ARYL-CARBAMIC ACIDS

Robert Eugene Etzelmiller, Wilmington, Del., assignor to E. I. du Pont de Nemours & Company, Wilmington, Del., a corporation of Delaware No Drawing. Application July 18, 1934,
Serial No. 735,820

8 Claims. (Cl. 260—105)

This invention relates to a novel process for producing certain organic compounds which are useful as intermediates for dyestuffs. More particularly, this invention deals with a process for producing compounds of the general formula

in which formula X represents an alkyl, aralkyl, aryl or hydroaryl radical which may be further substituted by radicals such as alkyl, alkoxy or halogen; and A represents an arylene nucleus of the benzene or naphthalene series which may be further substituted by radicals such as alkyl, alkoxy, aryl, aryloxy, trifluoromethyl, and halogen; and in which both X and A are free from water-solubilizing groups such as carboxylic acid or sulfonic acid groups.

Compounds of the above general formula possess valuable utility as intermediates for azo dyestuffs.

It is an object of my invention to provide an improved and economical process for producing compounds of the above general formula. Other and further important objects of this invention will appear as the description proceeds.

Certain members of the series which may be represented by the above general formula, more especially certain amino-aryl-urethanes are old in the art, and have been prepared by condensing a halogen-arylamine with urethane

(See U. S. Patent No. 1,735,690; Example 3). This method, however, is not very practical or economical.

Now according to my improved process one selects as initial material, an arylamine of the general formula HA—NH₂, wherein A is an arylene radical as above defined, and condenses the same directly with a chlorocarbonate of the type ClCO—OX, where X has the same significance as above. This compound in turn may be obtained by phosgenation of the corresponding alcohol or phenol X—OH. The intermediate N-aryl-carbamate thus obtained is then nitrated according to any of the customary methods of nitration, and the nitro compound thus obtained is reduced in the usual manner to give the desired N-(amino-aryl)-carbamate. The entire reaction may be illustrated by the following series of equations:

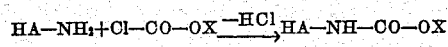

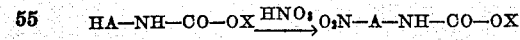

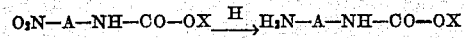

This invention will be more readily understood by reference to the following examples, in which all quantities are stated in parts by weight, but it is not intended to be limited thereby.

EXAMPLE I

*N-(4-amino-5-methyl-2-methoxy-phenyl)-methyl-carbamate*

A mixture of

|  | Parts |
|---|---|
| 4-methoxy-3-amino-toluene | 13.7 |
| Benzene | 200.0 |
| Methyl chlorocarbonate | 14.0 | is refluxed with stirring for 7 to 8 hours. The benzene is removed by steam distillation and the urethane formed in the reaction is filtered off from the cooled mixture.

The urethane is then subjected to nitration by dissolving the same in approximately 200 parts of glacial acetic acid and slowly adding 9.2 parts of nitric acid (70%) at 20 to 25° C. On diluting with water, the nitro-body separates almost quantitatively. It is filtered and reduced with iron and acetic acid in the usual manner for reductions of this type. The amine is extracted from the iron sludge with alcohol, and precipitated by diluting with water. Without further purification the base melts at 97 to 99° C.

The product has the probable formula:

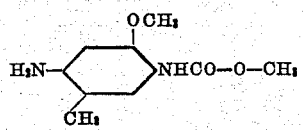

By substituting in one experiment an equivalent amount of 4-chloro-2-amino-anisole in the above procedure, (4 - amino - 5 - chloro - 2 - methoxy-phenyl)-methyl carbamate was obtained.

EXAMPLE II

*N-(4-amino-2,5-dimethoxy-phenyl)-methyl-carbamate*

15.3 parts of 2,5-dimethoxy-aniline are condensed with methyl-chlorocarbonate, nitrated and reduced as in Example I. Without further purification the base melts at 122 to 124° C. It corresponds most probably to the following formula:

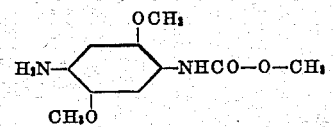

Other carbamates or "urethanes" of similar structure are obtained by using other chlorocarbonates; for example, ethyl-, butyl-, benzyl-chlorocarbonate, etc.

Example III

*N-(4-amino-2,5-dimethoxy-phenyl)-(β-methoxy-ethyl)-carbamate*

18.1 parts of 2,5-diethoxy-aniline are condensed with 15.0 parts of β-methoxy-ethyl-chlorocarbonate, nitrated and reduced as in Example I.

The product has most probably the following formula:

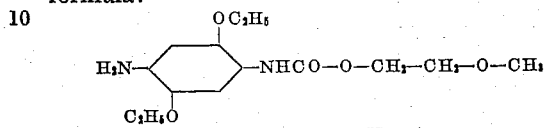

Example IV

*N-(4-amino-2,5-diethoxy-phenyl)-n-butyl-carbamate*

18.1 parts of 2,5-diethoxy-aniline are condensed with 15.0 parts of n-butyl chloro-carbonate and nitrated as in Example I. The nitro-body is suspended in 100 parts of methyl alcohol, and reduced by hydrogenation at 100° C. under an initial pressure of 500 pounds, using a reduced nickel catalyst. When the reduction is complete, as indicated by the fact that the pressure has become constant, the pressure is released, and the hot mixture is filtered to remove the catalyst. The base is precipitated from the filtered alcohol solution by diluting with water. The melting range of the base thus obtained is 75 to 78° C. It has the following formula:

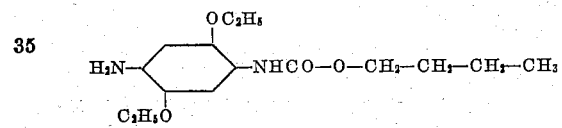

Example V

*N-(4-amino-2,5-diethoxy-phenyl)-isopropyl-carbamate*

18.1 parts of 2,5-diethoxy-aniline are condensed with 15.0 parts of isopropyl-chlorocarbonate, nitrated and reduced as in Example II. Without further purification the base melts at 92 to 96° C. It has most probably the following formula:

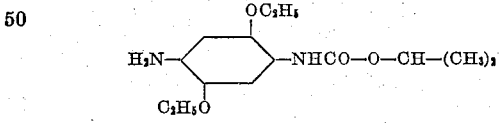

Example VI

*N-(4-amino-2,5-diethoxy-phenyl)-benzyl-carbamate*

18.1 parts of 2,5-diethoxy-aniline are condensed with 20.0 parts of benzyl chlorocarbonate and nitrated as in Example I. The nitro-body is reduced in methyl alcohol by hydrogenation at 100° C. using a reduced nickel catalyst, as described in Example IV. The base is precipitated from the filtered alcohol solution by diluting with water. It melts at about 103 to 106° C., and corresponds in structure most probably to the following formula:

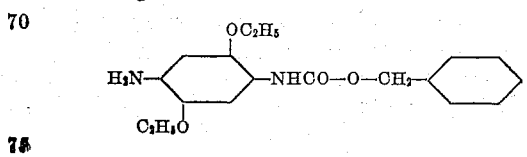

Example VII

*N-(4-amino-2,5-diethoxy-phenyl)-methyl-carbamate*

18.1 parts of 2,5-diethoxy-analine are heated in 100 parts of water to 80–85° C. until the amine has melted. 20 parts of carbon-tetrachloride are then added and the mixture cooled to 60–70° C. 14 to 16 parts of methyl-chlorocarbonate are then added, and sufficient sodium carbonate to maintain a slight alkalinity to brilliant yellow paper. The mixture is then heated to 85–90° C. to remove the carbon-tetrachloride, cooled and the condensation product filtered. The nitration is carried out as in Example I, and the nitro-body is then reduced with iron and acetic acid or by any other suitable method, for instance as follows:

The press cake is dissolved in hot water and added to a mixture of 30 parts of iron, 150 parts of water and 5 to 10 parts of acetic acid at 100 to 103° C. When the reduction is complete, the mixture is made alkaline with soda ash, filtered and washed. The iron sludge is extracted with alcohol, and the amine precipitated from the alcoholic extract as slightly colored crystals, by the addition of water. Its melting point is about 103° C., and it corresponds most probably to the formula:

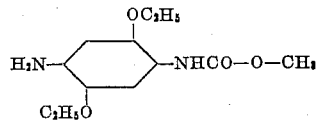

By substituting an equivalent weight of 2-methoxy-1-amino-naphthalene for 2,5-diethoxy-analine in the above procedure, N-(4-amino-2-methoxy-1-naphthyl)-methyl-carbamate is obtained.

To illustrate a different mode of operation, one may carry out the urethane synthesis precisely as described in Example I, and then effect the reduction by the hydrogenation method illustrated in Example IV. For instance, one may proceed as follows:

A mixture of

| | Parts |
|---|---|
| 2,5-diethoxy-aniline | 18.1 |
| Benzene | 200.0 |
| Methyl chlorocarbonate | 11.0 | is refluxed with stirring for six hours. The benzene is then removed by steam distillation and the N-(2,5-diethoxy-phenyl)-methyl-carbamate which separates as an oil, but quickly solidifies on cooling (M. P. 87 to 88° C.), is filtered off and dissolved in 150 parts of glacial acetic acid. Nitration is effected by slowly adding 9.3 parts of 70% nitric acid at 20 to 25° C. After diluting the nitration mass with water the nitro-body is obtained by filtration. It may be reduced in methyl alcohol by hydrogenation at 100° C. using a reduced nickel catalyst. When the reduction is complete, the hot mixture is filtered to remove the catalyst. Most of the alcohol is then removed by distillation and the free base obtained by adding water and allowing the mixture to cool. It may be recrystallized from alcohol and water.

Example VIII

*N-(4-amino-2,5-diethoxy-phenyl)-ethyl-carbamate*

18.1 parts of 2,5-diethoxy-aniline are condensed with 14.0 parts of ethyl chlorocarbonate, nitrated and reduced as in Example IV. The product melts at 101 to 102° C., and corresponds most probably to the following structure:

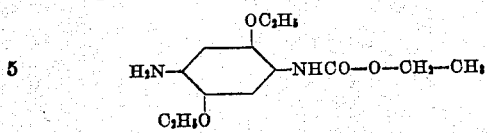

It will be understood that while I have illustrated my novel methods of synthesis by the preparation of certain specific compounds, the methods are equally applicable to the preparation of many other compounds, not specifically mentioned in the preceding description. Of particular interest among such further compounds which come within the scope of my invention are compounds of the general formula:

where the X-portion of the molecule is a
methyl-, ethyl-, propyl-, or other alkyl radical;
β-chlor-ethyl-, or other halogenated alkyl radical;
β-methoxy-ethyl-, or similar ether radical;
phenyl-, cresyl-, and other aryl radical;
an alkyl-, alkoxy- or halogen substituted phenyl radical;
cyclohexyl-, tetrahydro naphthyl and other hydroaromatic radical;
benzyl-, or a substituted aralkyl group.

Similarly, the "A" radical may be an arylene nucleus of either the benzene or naphthalene series containing optionally further substituents such as methyl, or other alkyl radicals, methoxy or other alkoxy radicals, phenyl or other aryl radicals, halogens, phenoxy or other aryloxy groups.

All these compounds possess the common characteristic of being adapted for the manufacture of dyestuffs of the azo class, particularly of the ice-color series. Many of the dyestuffs thus prepared belong to the commercially valuable ranges of color and are characterized by excellent fastness qualities.

It will be understood that the modes of operation indicated in the above specific examples may be varied within wide limits, to suit one's convenience or the particular compound operated upon. Thus, the reaction of the arylamine with the chloro-carbonate to produce an intermediate urethane or carbamate, may be carried out in any suitable inert organic medium, for instance benzene, toluene, carbon tetrachloride, tetrachlorethane, etc., or it may be carried out in aqueous medium. In either case, acid binding agents may be added, for instance sodium acetate, sodium bicarbonate, sodium hydroxide, sodium carbonate, potassium carbonate, etc. Again the acid binding agent may be omitted, the reflux temperature being depended upon to carry off the HCl formed in the reaction.

The nitro compound obtained in the nitration step may be reduced by hydrogenation with a catalyst in the presence of a solvent or diluent, as illustrated in Example IV; by the aid of an acid such as acetic or hydrochloric, and a metal, such as iron, tin, or zinc, in aqueous solution, as illustrated, for instance, in Example I; or by any other suitable or standard method for reducing nitro groups to amines, for instance, by the action of sodium sulfide or sulfhydrate.

The nitration itself may be effected in any suitable manner, following standard practice, but should preferably avoid strongly mineral acid medii which might act to decompose the ester. Best results are obtained with an organic solvent such as acetic, or in aqueous suspension, using nitric acid.

Many other variations and modifications are possible in my preferred procedure above set forth, without departing from the spirit of this invention.

I claim:
1. A process for producing a compound of the general formula

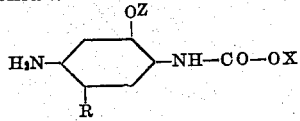

wherein X stands for an alkyl or aralkyl radical, R stands for a lower alkyl or alkoxy group, and Z stands for a lower alkyl group, which comprises condensing a 2-alkoxy-aniline derivative of the general formula

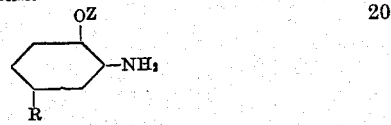

wherein R and Z have the same significance as above, with a chloro-carbonate of the general formula XO—COCl, wherein X has the same significance as above, to produce the corresponding N-aryl-carbamate, nitrating said N-aryl-carbamate, and reducing the nitro compound thus obtained to the corresponding amine.

2. The process of producing an N-(4-amino-2,5-diethoxy - phenyl) - carbamic-acid - ester, which comprises condensing 2,5-diethoxy-aniline with a chlorocarbonate of the general formula XO—COCl, wherein X stands for alkyl or aralkyl, nitrating the resulting N-(2,5-diethoxy-phenyl)-carbamic-acid-ester, and reducing the nitro compound to the corresponding amine.

3. In the process of producing an N(p-aminoaryl)-carbamic-acid-ester, the step which comprises nitrating an N(2-alkoxy-phenyl)-carbamic-acid-ester of the general furmula

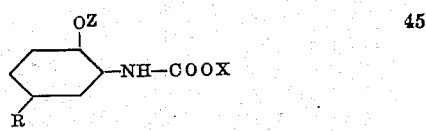

wherein X, Z and R have the same significance as in claim 1, to produce the corresponding nitro compound.

4. In the process of producing an N-(4-amino-2,5 - diethoxy-phenyl)- carbamic-acid - ester, the step which comprises reacting with nitric acid upon a solution of an N-(2,5-diethoxy-phenyl)-carbamic-acid-ester in glacial acetic acid to produce the corresponding nitro compound.

5. A compound of the general formula

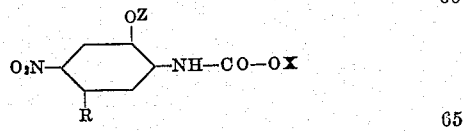

wherein X stands for an alkyl or aralkyl radical, R stands for a lower alkyl or alkoxy group, and Z stands for a lower alkyl group.

6. N-(4-nitro-2,5-diethoxy-phenyl)-carbamic-acid esters.

7. N-(4-nitro-2,5-diethoxy-phenyl)-methyl carbamate.

8. N-(4-nitro-2,5-diethoxy-phenyl)-urethane.

ROBERT E. ETZELMILLER.